May 23, 1961 H. TRAUE 2,984,874
SECTIONAL SILO
Filed Sept. 18, 1957 3 Sheets-Sheet 1
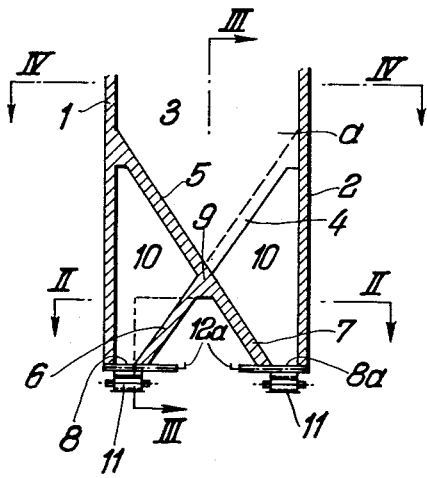
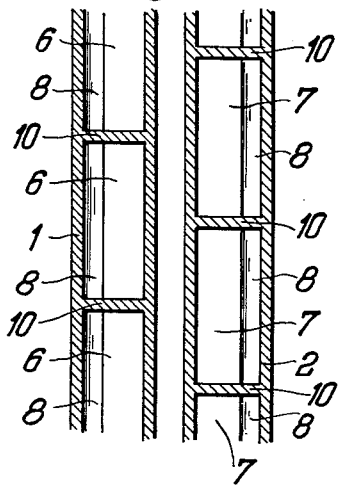
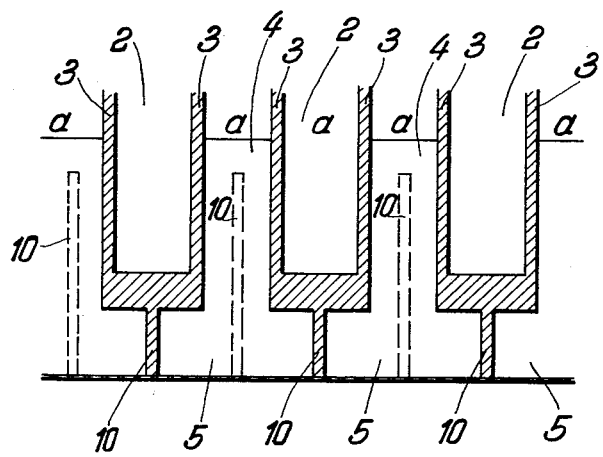
Inventor:
HERBERT TRAUE
BY Robert H. Jacob
AGENT

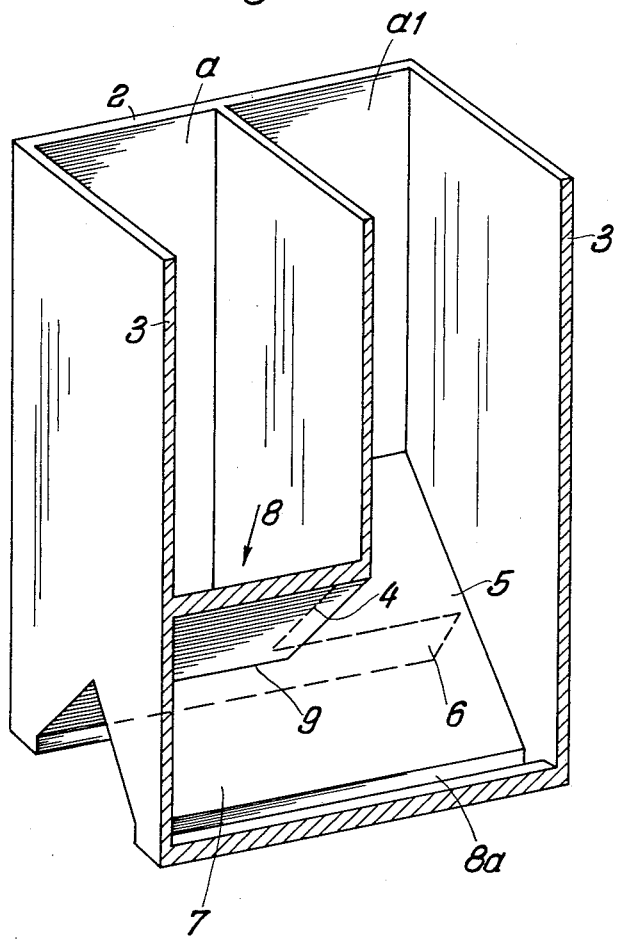

United States Patent Office 2,984,874
Patented May 23, 1961

2,984,874
SECTIONAL SILO
Herbert Traue, Marienstr. 55, Minden, Westphalia, Germany
Filed Sept. 18, 1957, Ser. No. 684,798
Claims priority, application Germany Sept. 20, 1956
5 Claims. (Cl. 20—1.2)

In storing products of all types, primarily in storing mealy or grainy products, sectional silos are known where each grain bin has only one inclined funnel plane with a single discharge opening along the longitudinal wall of the sectional silo. In such sectional silos where the discharge space of each single silo bin is of the same width as the width of the associated silo bin it is possible, depending on the type of products stored, that the difficulty arises of the stored product becoming clogged in the silo chamber, particularly at the discharge end of the silo chamber in the area of the inclined funnel wall. Thus, the uninterrupted discharging of the stored product from the individual silo chamber, especially in regulated quantities as it is frequently required, is frequently made impossible.

It is an object of the present invention to provide a sectional silo in which the discharge of the product takes place without danger of wedge formation or clogging in the discharge end of the individual silo bins, while, at the same time, avoiding any increase in the space requirement for such a sectional silo, the width of which is limited by the individual adjacent silo chambers. In a sectional silo in accordance with the invention discharging of the stored product from any desired silo bin, for example by means of a chain discharging means or the like, should be possible without any individual chamber requiring the use of a separate discharge means.

In accordance with the invention the inclined funnel walls or planes of adjacent silo chambers are disposed to cross over alternately to one of the opposite longitudinal walls of the sectional silo. In this connection arrangements are made that the inclined funnel plane of each silo bin is enlarged below the crossover line of the inclined funnel planes for the purpose of increasing the discharge space. In this manner the inclined funnel planes of a silo chamber which cross one another in the area of the adjacent silo bins are enlarged toward the bottom. The discharge of each silo chamber thus increases toward the right or the left or toward both sides. The enlargement of the discharge space is also available above the line of crossing of the funnel walls, i.e. up to the start of the adjacent main funnel planes.

The separating walls between adjacent silo bins below the inclined funnel planes may be disposed in such a manner with respect to the main separating walls of adjacent silo chambers that the width of the discharge space and of the associated aperture of each silo chamber is substantially twice as large as the width of the associated silo bin. For example, an enlargement of the inclined funnel plane or of the discharge space can be provided on both sides by approximately half the width of the chamber.

If the silo bin or chamber is increased by the width of the adjacent silo bin in the area of the discharge space of each silo bin only on one side, then additional separating walls in the region of the discharge space are eliminated. Thus it is possible to obtain plane spacing walls between the adjacent silo chambers which merge in a plane with the spacing wall in the area of the discharge space. This results in that a sectional silo can be constructed without involving any dead space in such a manner that the transverse wall of the sectional silo is formed in an even plane without any offset.

The crossed bottom silo above described has its silo bin discharge openings arranged in both opposite longitudinal walls. Thus, it is suitable for separate or individual discharge, but especially for collective discharge by chain discharge means or the like. In accordance with the invention, each silo chamber may be provided with one or more closure slides or suitable closing elements especially for collective discharge so that the discharging of the stored product can take place simultaneously out of all silo bins of the sectional silo or at random out of one or several silo bins.

Further objects and advantages of the invention will become apparent from the following description of an embodiment of the subject of the application which is illustrated in the drawings, in which:

Fig. 1 is a vertical cross section through a silo chamber of a sectional silo;

Fig. 2 is a horizontal cross section along the line II—II of Fig. 1;

Fig. 3 is a longitudinal section through a sectional silo taken along line III—III of Fig. 1;

Fig. 5 is a perspective view of two adjacent silo chambers of a sectional silo in an alternate embodiment where the front longitudinal wall is not shown to clarify the arrangement;

Figure 4:
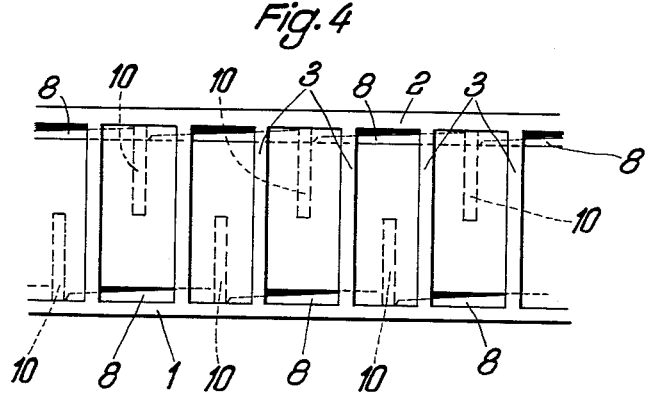
Fig. 4 is a cross section through a sectional silo taken along line IV—IV of Fig. 1.

The sectional silo can be constructed of concrete in the usual fashion, but also be made of sheet metal and mobile for erection in different locations. The sectional silo is provided with any desired number of silo chambers or bins *a* in a series arrangement, one behind the other.

For example, the series silo comprises side walls 1 and 2 between which the intermediate walls 3 are provided whereby the silo bins *a* are formed in a known manner. The inclined funnel plane members 4 and 5 are defined by interengaging plane members 6 and 7 which cross one another. Each silo chamber possesses only one inclined funnel plane so that the discharge opening 8 is formed only at the lower end. Furthermore, the inclined funnel planes of adjacent silo chambers or bins are directed alternately to one and then to the opposite wall of the sectional silo. Thus, in accordance with Fig. 1, the funnel plane members 5 are inclined downwardly toward side wall 2 while the plane members 4 are inclined toward side wall 1.

This arrangement makes it possible to form enlarged discharge openings for the individual silo bins if the space remaining below the adjacent funnel plane members or walls 4, 5 is utilized for that purpose. To achieve this objective the intermediate walls 3 which divide the silo into bins *a* are cut at the oppositely directed funnel walls 4, 5. This results in a mutual, continuous space which is divided by transverse walls 10 arranged rearwardly of each funnel plane and which extends from the start of each inclined funnel plane 4 or 5 vertically to the discharge opening 8.

This arrangement is shown particularly by Figs. 2, 3 and 4 of the drawing. The transverse walls 10 here are always located centrally between two adjacent spacing walls 3. As a consequence, the width of each discharge opening 8 is twice as large as the width of the individual silo bins *a*.

Figure 6:
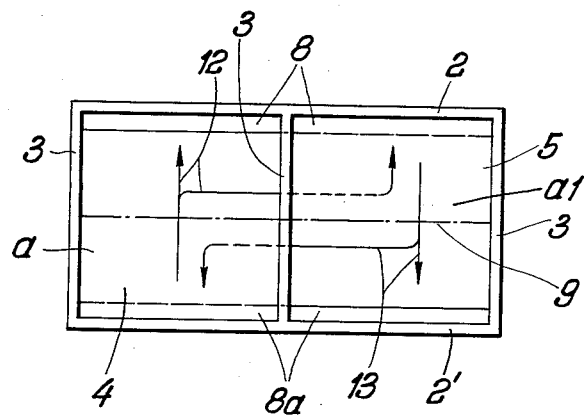
Fig. 6 is a top view of Fig. 5 with the front longitudinal wall added.

In the embodiment in accordance with Figs. 5 and 6 two adjacent silo bins a, a1 are illustrated. In Fig. 5 the front longitudinal wall of these silo bins is omitted in order to show the construction more clearly. It is seen that the inclined funnel plane of the silo bin a1 is enlarged below the crossover line 9 longitudinally of the silo chamber a, so that the discharge space of silo chamber a1 in the direction to the discharge opening 8a corresponds to the width of both silo bins a and a1. In the same manner the inclined funnel wall 4 of silo bin a is provided with an enlargement below the crossover line 9 in the direction of and of the width of silo bin a1. The enlarged discharge space, when considered vertically, extends above the crossover line 9 all the way to the start of the upper end of the inclined funnel plane.

Thus in this embodiment the additional spacing walls 10 of the embodiment in accordance with Figs. 1 to 4 are eliminated. The spacing walls 3 between the individual silo chambers are of such height and width as correspond to the relative dimensions of the sectional silo. If it is assumed that the silo bin is the end bin of a sectional silo, it is seen that the respective end wall of the sectional silo is in a single plane and that the space of the entire sectional silo which is defined by the enclosing walls is available in its entirety as a storage space for the produce to be stored.

It is therefore apparent that the crosswise, oppositely inclined funnel plane members of adjacent bins have a portion 6 or 7 which, below the line of crossover with the adjacent funnel plane member of an adjacent bin, is of substantially twice the width of the portion 5 or 4, respectively, of said adjacent funnel plane member above the line of crossover, and is also substantially twice the width of one bin, and extends laterally below the portion 5 or 4 above the line of crossover of at least one adjacent funnel plane and below at least one adjacent bin. Furthermore the area of the bin adjacent the funnel plane below the line of cross over and of the discharge aperture 8 extends below the adjacent bin proximate and inwardly of the adjacent wall 1 or 2, and also the discharge aperture 8 of each bin is substantially twice as large as the width of the bin with which it is associated.

In the plan view in accordance with Fig. 6 the line 9 is dashed and the front longitudinal wall is identified by reference numeral 2'. Furthermore, it is indicated schematically how the flow of the material out of the silo bins takes place. The arrows 12 thus indicate the flow from silo bin or chamber a to the discharge opening 8, while the arrows 13 indicate the flow of the material out of silo bin a1 to the discharge opening 8a. As already described hereinabove and as indicated in the drawings, the central spacing wall 3 does not extend through to the bottom so that below its obliquely extending bottom edge the material can flow through as indicated by the arrows.

Below the discharge openings 8 of the individual silo chambers the discharge belts 11 are provided. These devices may be in the form of two common collector belts, such as conveyor belts, or each cell may cooperate with a separately operating discharging device. In this manner it is made possible that undisturbed discharge of the contents of the silo is obtained without wedging of the stored material interfering with the free flow.

Separate slides or the like may be provided above the chains, as indicated as 12a, which permit the control of the quantity being discharged from any individual silo bin, but which also make it possible that optionally one or the other silo bin may be completely closed at its discharge opening.

Having now described my invention with reference to the embodiments illustrated in the drawings, I do not wish to be limited thereto, but what I desire to protect by letters patent is set forth in the appended claims.

I claim:

1. Sectional silo for storing products comprising a plurality of silo bins having a pair of common opposite longitudinal walls, each bin being provided with an inclined funnel plane member and a discharge aperture endwise of said funnel plane member and proximate one said longitudinal walls, said funnel plane members of adjacent bins being disposed crosswise relative to one another and alternately oppositely inclined toward one of said longitudinal walls, with the portion of the funnel plane member of one bin below the line of cross over with the adjacent funnel plane member of an adjacent bin extending below the upper portion of said adjacent funnel plane member and below said adjacent bin, thereby increasing the area of said funnel plane member and of the discharge space, said funnel plane member of each silo bin being extended to one side by a width corresponding to the width of the adjacent silo bin.

2. Sectional silo for storing products comprising a plurality of silo bins having a pair of common opposite longitudinal walls, each bin being provided with an inclined funnel plane member and a discharge aperture endwise of said funnel plane member and proximate one of said longitudinal walls, said funnel plane members of adjacent bins being disposed crosswise relative to one another and alternately oppositely inclined toward one of said longitudinal walls, with the portion of the funnel plane member of one bin below the line of cross over with the adjacent funnel plane member of an adjacent bin being of greater width than said one bin above said line and extending laterally below said adjacent funnel plane member and below said adjacent bin, the lowermost end of said one bin including the lower end of said funnel plane member, and the discharge aperture extending under said adjacent bin and being disposed inwardly of the adjacent one of said longitudinal walls.

3. Sectional silo for storing products comprising a plurality of silo bins having a pair of common opposite longitudinal walls, each bin being provided with an inclined funnel plane member and a discharge aperture endwise of said funnel plane member and proximate one of said longitudinal walls, said bins being arranged in a single row and adjacent alternate bins having their discharge apertures disposed along opposite walls and under at least a portion of one adjacent bin and said discharge apertures of alternate bins extending in rows parallel to the discharge openings of the other bins and under adjacent bins, said funnel plane members of adjacent bins being disposed crosswise relative to one another and alternately oppositely inclined toward one of said opposite longitudinal walls, with the funnel plane member of one bin below the line of cross over with the adjacent funnel plane member of an adjacent bin extending under a portion of said adjacent funnel plane member and said discharge apertures being disposed to discharge downwardly.

4. Sectional silo for storing products comprising a plurality of silo bins having a pair of common opposite longitudinal walls, each bin being provided with an inclined funnel plane member and a discharge aperture endwise of said funnel plane member and proximate one said longitudinal walls, said bins being arranged in a single row and adjacent alternate bins having their discharge apertures disposed along opposite walls and under at least a portion of one adjacent bin and said discharge apertures of alternate bins extending in rows parallel to the discharge apertures of the other bins and under adjacent bins, said funnel plane members of adjacent bins being disposed crosswise relative to one another and alternately oppositely inclined toward one of said opposite longitudinal walls, with the funnel plane member of one bin below the line of cross over with the adjacent funnel plane member of an adjacent bin extending under a portion of said adjacent funnel plane member, and each said silo bin being provided with a closure member in the form of a sliding gate or the like extending horizontally across the bottom of the structure.

5. Sectional silo for storing products comprising a plurality of silo bins having a pair of common opposite longitudinal walls, each bin being provided with an inclined funnel plane member and a discharge aperture endwise of said funnel plane member and proximate one of said longitudinal walls, said funnel plane members of adjacent bins being disposed crosswise relative to one another and alternately oppositely inclined toward one of said longitudinal walls, with the portion of the funnel plane member of one bin below the line of cross over with the adjacent funnel plane member of an adjacent bin being of substantially twice the width of the portion of said funnel plane member above the line of cross over and of substantially twice the width of said one bin above the line of cross over and extending laterally below the portion above the line of cross over of at least one adjacent funnel plane member, and the area of said one bin adjacent said funnel plane member below the line of cross over and the discharge aperture of said one bin extending below said at least one adjacent bin proximate and inwardly of the adjacent portion of said longitudinal wall, and said discharge aperture being substantially twice as wide as the width of said one silo bin above the line of cross over.

References Cited in the file of this patent

UNITED STATES PATENTS

| | | |
|---|---|---|
| 282,812 | Watson | Aug. 7, 1883 |
| 616,181 | Bradley | Dec. 20, 1898 |
| 1,406,928 | Bull | Feb. 14, 1922 |
| 2,842,096 | Bradfield | July 8, 1958 |

FOREIGN PATENTS

| | | |
|---|---|---|
| 103,208 | Sweden | Dec. 2, 1941 |